(12) United States Patent
Matsumura et al.

(10) Patent No.: US 10,996,403 B2
(45) Date of Patent: May 4, 2021

(54) OPTICAL FIBER MOUNTING METHOD AND OPTICAL MODULE

(71) Applicant: FUJITSU LIMITED, Kawasaki (JP)

(72) Inventors: Takayoshi Matsumura, Yokohama (JP); Naoaki Nakamura, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 16/854,956

(22) Filed: Apr. 22, 2020

(65) Prior Publication Data

US 2020/0363592 A1    Nov. 19, 2020

(30) Foreign Application Priority Data

May 16, 2019 (JP) .............................. JP2019-092941

(51) Int. Cl.
| | |
|---|---|
| *G02B 6/36* | (2006.01) |
| *G02B 6/30* | (2006.01) |
| *G02B 6/44* | (2006.01) |
| *G02B 6/42* | (2006.01) |
| *G02B 6/38* | (2006.01) |

(52) U.S. Cl.
CPC ............. *G02B 6/3636* (2013.01); *G02B 6/30* (2013.01); *G02B 6/3897* (2013.01); *G02B 6/4249* (2013.01); *G02B 6/441* (2013.01); *G02B 6/3887* (2013.01)

(58) Field of Classification Search
CPC ........ G02B 6/3636; G02B 6/30; G02B 6/3887; G02B 6/3897; G02B 6/4249; G02B 6/441
USPC ..................... 385/31, 49–51, 65, 88, 89, 137
See application file for complete search history.

(56) References Cited

U.S. PATENT DOCUMENTS 5,694,506 A    12/1997 Kobayashi et al.

FOREIGN PATENT DOCUMENTS

| JP | H08-248254 A | | 9/1996 |
|---|---|---|---|
| JP | H09-178971 | * | 7/1997 |
| JP | H09-178971 A | | 7/1997 |

* cited by examiner

*Primary Examiner* — Michael P Mooney
(74) *Attorney, Agent, or Firm* — Fujitsu Patent Center

(57) ABSTRACT

An optical fiber mounting method that mounts a plurality of optical fibers on a substrate includes: bundling the optical fibers together with a bundling member; adjusting a height of the bundling member from a surface of the substrate or an angle of inclination of the bundling member relative to the surface of the substrate; bringing end faces of the optical fibers bundled with the bundling member into contact with end faces of optical waveguides on the substrate, the optical waveguides respectively corresponding to the optical fibers; and bonding the optical fibers to the substrate, in a state where the end faces of the optical fibers are in contact with the end faces of the optical waveguides.

5 Claims, 8 Drawing Sheets

FIG.5A

| | WITHOUT OFFSET | WITH OFFSET |
|---|---|---|
| SHAPE | 1 WAVELENGTH | 0.5 WAVELENGTH |
| LOAD RATIO | 1 | 1/4 |

FIG.5B

| | WITHOUT ANGLE OF INCLINATION | WITH ANGLE OF INCLINATION |
|---|---|---|
| SHAPE | 1.5 WAVELENGTHS | 0.75 WAVELENGTH |
| STRESS RATIO | 1 | 1/4 |

OPTICAL FIBER MOUNTING METHOD AND OPTICAL MODULE

CROSS-REFERENCE TO RELATED APPLICATION

This application is based upon and claims the benefit of priority of the prior Japanese Patent Application No. 2019-092941, filed on May 16, 2019, the entire contents of which are incorporated herein by reference.

FIELD

The embodiment discussed herein is related to an optical fiber mounting method and an optical module.

BACKGROUND

In recent years, optical integration technology called silicon photonics may be used for optical modules, for example, optical modulators. In silicon photonics, ultra-micro photonic chips having highly integrated optical control functions are able to be manufactured by use of, for example, complementary metal oxide semiconductor (CMOS) processes.

An optical waveguide that transmits an optical signal is formed on such a photonic chip. An optical signal that has been generated from a light source, for example, a laser diode, and has been optically modulated passes through the optical waveguide and is output to an optical fiber connected to the photonic chip. At a connecting portion between the optical waveguide and optical fiber, a groove for positioning of the optical fiber has been formed on the photonic chip, for example, and an end face of the optical fiber guided through the groove is butted against an end face of the optical waveguide. That is, the optical waveguide and the optical fiber are directly connected to each other on the photonic chip.

The groove for the positioning of the optical fiber is able to be formed by a wafer process and is thus small in positional error and also small in manufacture variation. Furthermore, this structure for the direct connection between the optical waveguide and the optical fiber enables more accurate positioning of the optical fiber than a structure in which a ferrule fixed with an adhesive onto a photonic chip holds an optical fiber because the structure for the direct connection is without displacement of the ferrule due to curing of the adhesive.

Patent Literature 1: Japanese Laid-open Patent Publication No. 09-178971

Patent Literature 2: Japanese Laid-open Patent Publication No. 08-248254

The number of optical waveguides formed on a photonic chip is not necessarily one, and plural optical waveguides may be formed on a photonic chip. Different optical fibers are then respectively connected to the plural optical waveguides. The plural optical fibers are formed into an optical fiber bundle by being bundled together, and this optical fiber bundle is connected to the photonic chip.

However, lengths of the optical fibers forming the optical fiber bundle are not necessarily the same, and positions of end faces of the optical fibers may vary. Therefore, for the end faces of all of the optical fibers to be brought into contact with end faces of optical waveguides, an end face of a short optical fiber is brought into contact with an end face of an optical waveguide by bending of a long optical fiber. There is a problem that the long optical fiber is bent by being pushed to the end face of the optical waveguide in a state where the long optical fiber's end face has been butted against the end face of the optical waveguide, and the end faces of the optical fiber and optical waveguide are thereby pressed and the optical fiber or optical waveguide may be thereby damaged.

SUMMARY

According to an aspect of an embodiment, an optical fiber mounting method mounts a plurality of optical fibers on a substrate. The optical fiber mounting method includes: bundling the optical fibers together with a bundling member; adjusting a height of the bundling member from a surface of the substrate or an angle of inclination of the bundling member relative to the surface of the substrate; bringing end faces of the optical fibers bundled with the bundling member into contact with end faces of optical waveguides on the substrate, the optical waveguides respectively corresponding to the optical fibers; and bonding the optical fibers to the substrate, in a state where the end faces of the optical fibers are in contact with the end faces of the optical waveguides.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 5A and 5B are diagrams illustrating specific examples of position of a bundling member and shape of an optical fiber;

DESCRIPTION OF EMBODIMENT

Preferred embodiments of the present invention will be explained with reference to accompanying drawings. The present invention is not limited by this embodiment.

Figure 1:
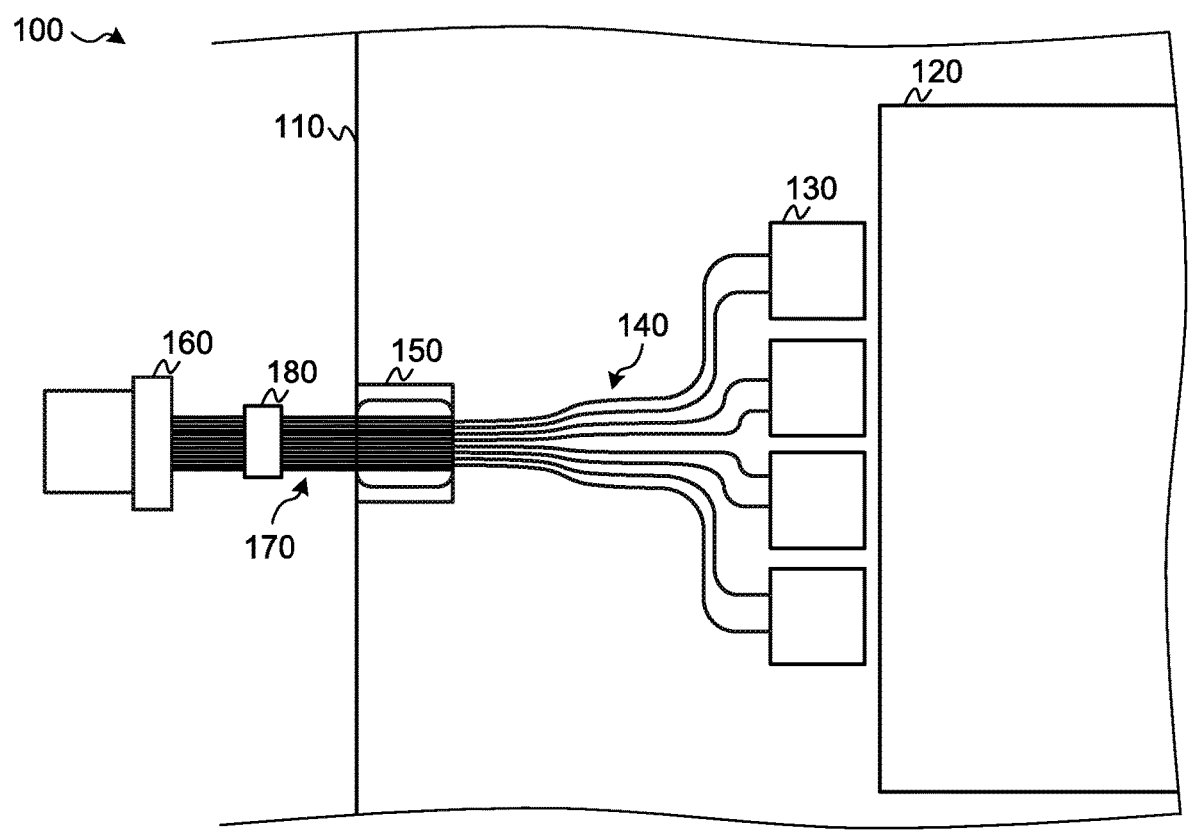
FIG. 1 is a diagram illustrating a configuration of an optical module according to an embodiment.

FIG. 1 is a diagram illustrating a configuration of an optical module 100 according to the embodiment. The optical module 100 illustrated in FIG. 1 has a substrate 110, a large scale integration (LSI) 120, photoelectric conversion units 130, optical waveguides 140, a connecting portion 150, an optical connector 160, an optical fiber bundle 170, and a bundling member 180.

The substrate 110 is a substrate made of, for example, glass epoxy resin. Various electric parts and optical parts are mounted on the substrate 110. Furthermore, the substrate 110 has the optical waveguides 140 formed thereon.

The LSI 120 is an integrated circuit that executes various types of processing. Processing by the LSI 120 is executed through electric signals. Therefore, the LSI 120 outputs electric signals to the photoelectric conversion units 130 and receives electric signals output from the photoelectric conversion units 130.

The photoelectric conversion units 130 convert the electric signals output from the LSI 120 into optical signals and output the optical signals to the optical waveguides 140. Furthermore, the photoelectric conversion units 130 convert optical signals input from the optical waveguides 140 into electric signals and output the electric signals to the LSI 120.

The optical waveguides 140 are optical waveguides formed on an upper surface of the substrate 110 and transmit optical signals. The optical waveguides 140 are formed by, for example, exposure of photosensitive resin to light in shapes of desired waveguide patterns. The optical waveguides 140 extend from the plural photoelectric conversion units 130 to the connecting portion 150 at an end portion of the substrate 110. Therefore, the plural optical waveguides 140 reach the connecting portion 150.

Figure 2:
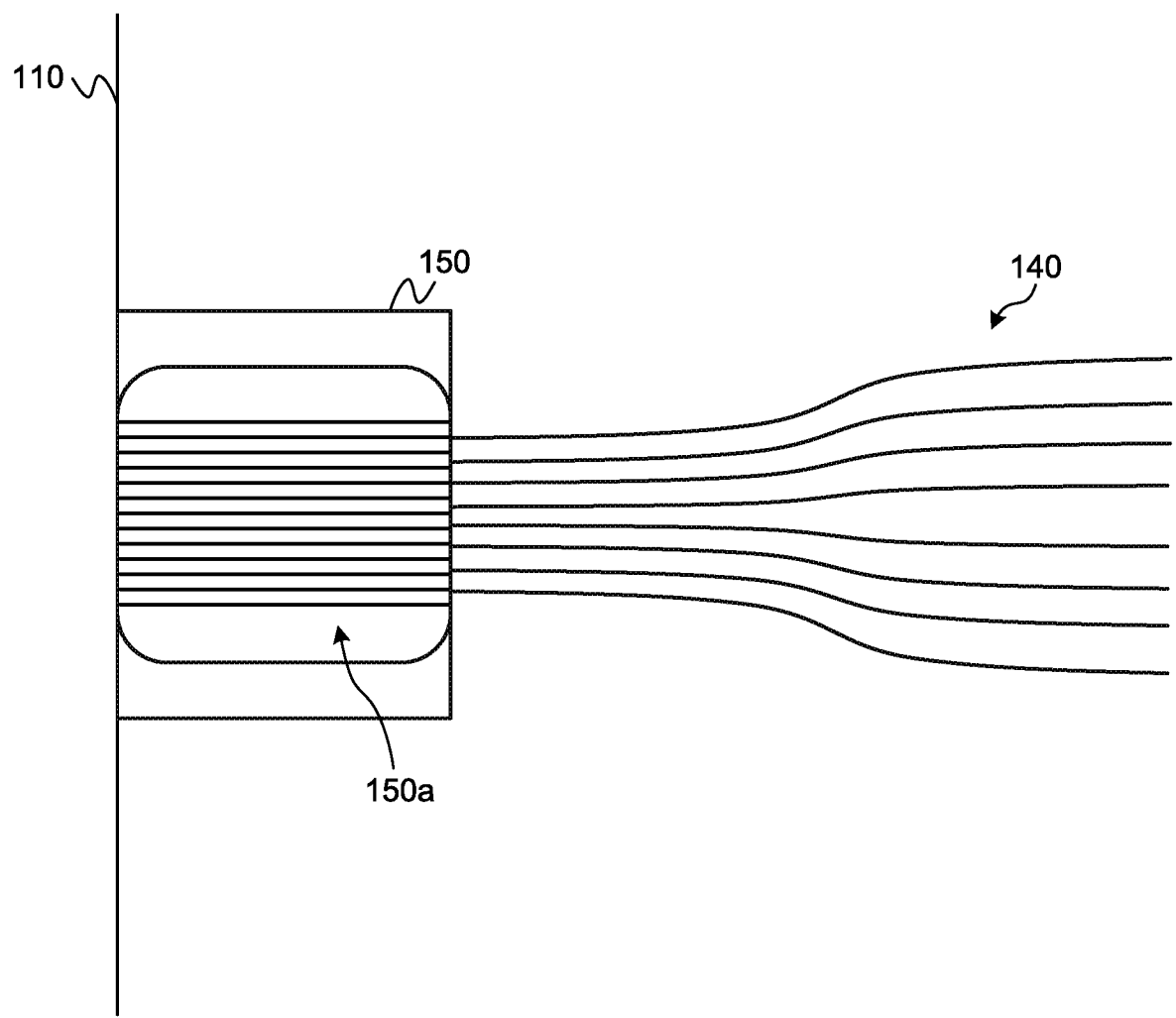
FIG. 2 is a diagram illustrating a configuration of a connecting portion.
Figure 3A:
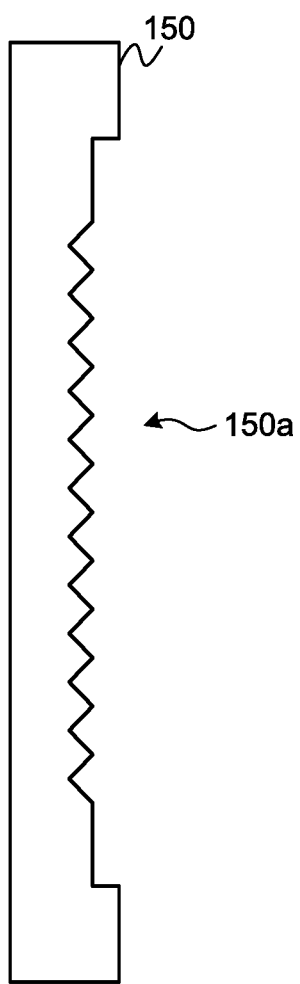
FIGS. 3A and 3B are diagrams illustrating an example of a configuration of fiber guiding grooves.
Figure 3B:
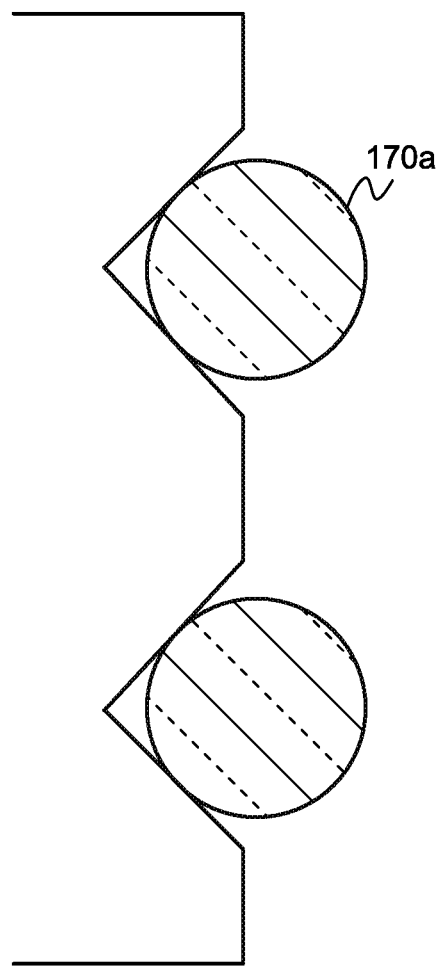

The connecting portion 150 is formed at the end portion of the substrate 110, is for positioning of optical fibers of the optical fiber bundle 170, and connects end faces of the optical fibers to end faces of the optical waveguides 140. Specifically, as illustrated in FIG. 2, the connecting portion 150 has a recessed portion lower than a surface of the substrate 110, the surface surrounding the recessed portion, and has fiber guiding grooves 150a on a bottom surface of the recessed portion. The fiber guiding grooves 150a guide the optical fibers to positions where the end faces of the optical fibers and the end faces of the optical waveguides 140 are connected to each other with the end faces of the optical fibers facing the end faces of the optical waveguides 140. That is, as illustrated in FIG. 3A, for example, the fiber guiding grooves 150a are V-shaped grooves formed at positions corresponding to the end faces of the optical waveguides 140. As illustrated in FIG. 3B, for example, by optical fibers 170a being supported by the V-shaped grooves, end faces of the optical fibers 170a are positioned to face the end faces of the optical waveguides 140.

As illustrated in FIG. 1, the optical connector 160 holds one end of the optical fiber bundle 170 and has a shape that is connectable to an external connector. The optical connector 160 outputs an optical signal to outside from each optical fiber 170a of the optical fiber bundle 170 and inputs an optical signal to each optical fiber 170a from the outside.

The optical fiber bundle 170 is formed by the plural optical fibers 170a being arranged side by side and being bundled together. The one end of the optical fiber bundle 170 is held by the optical connector 160 and the other end of the optical fiber bundle 170 is connected to the optical waveguides 140 at the connecting portion 150. At the connecting portion 150, the optical fibers 170a are guided by the fiber guiding grooves 150a and the end faces of the optical fibers 170a come into contact with the end faces of the optical waveguides 140 with the end faces of the optical fibers 170a facing the end faces of the optical waveguides 140. An end portion of the optical fibers 170a is fixed to the connecting portion 150 with an adhesive, for example, ultraviolet curing resin or photocurable resin.

The plural optical fibers 170a forming the optical fiber bundle 170 are bundled together with the bundling member 180. That is, the bundling member 180 forms the optical fiber bundle 170 by holding the plural optical fibers 170a between the optical connector 160 and the connecting portion 150. Lengths of the optical fibers 170a from the bundling member 180 to the end faces of the optical waveguides 140 are not the same, and in accordance with the shortest optical fiber 170a, the other optical fibers 170a are bent. That is, a part of the optical fibers 170a of the optical fiber bundle 170 is bonded, in a bent state, to the connecting portion 150.

Figure 4:
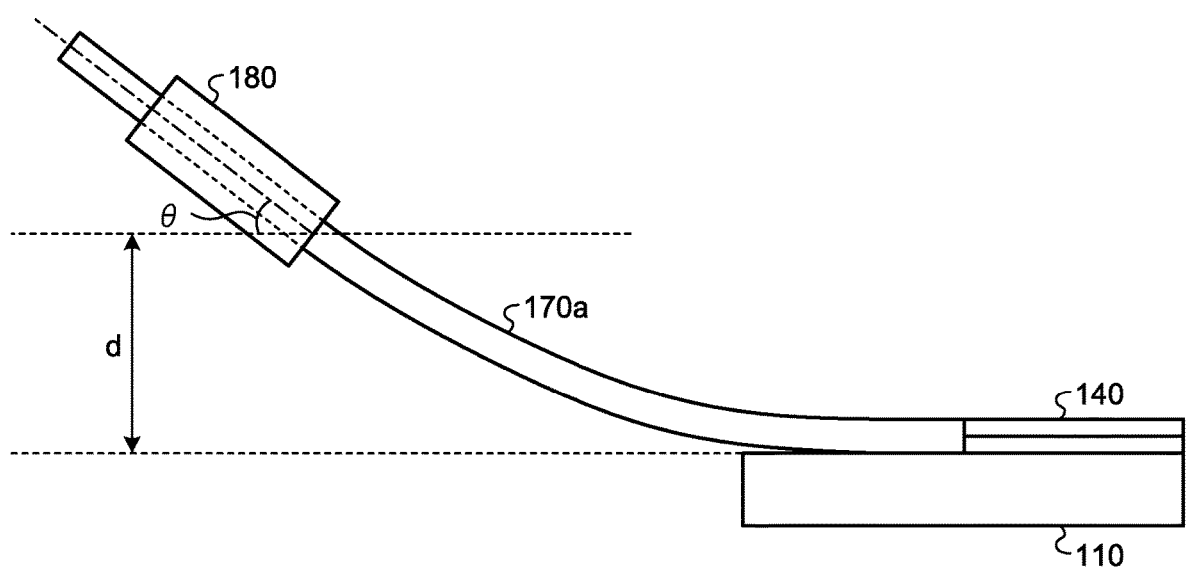
FIG. 4 is a diagram illustrating a state upon mounting of optical fibers.

When the optical fiber bundle 170 is mounted on the connecting portion 150, the bundling member 180 is supported in a state of being positioned higher than a surface of the substrate 110 and having an angle of inclination relative to the surface of the substrate 110. Specifically, as illustrated in FIG. 4, the bundling member 180 is supported: at a position provided with an offset d from the surface of the substrate 110; and with an angle of inclination 8 relative to the surface of the substrate 110. The offset d and the angle of inclination 6 are adjusted such that the bent optical fibers 170a are large in curvature radius. Loads applied to the end faces of the optical fibers 170a and end faces of the optical waveguides 140 are thereby able to be reduced and bending stress on the optical fibers 170a is thereby able to be reduced. As a result, the optical fibers 170a and the optical waveguides 140 are able to be prevented from being damaged.

Described now are relations between positions of the bundling member 180 and shapes of the optical fibers 170a.

As illustrated in FIG. 5A, when the bundling member 180 is without an offset by being positioned at the same height as the surface of the substrate 110 and the shape of an optical fiber 170a that is bent is expressed in wavelengths, the shape corresponds to 1 wavelength. In contrast, when the bundling member 180 has an offset by being positioned higher than the surface of the substrate 110 and the shape of an optical fiber 170a that is bent is expressed in wavelengths, the shape corresponds to 0.5 wavelength. In other words, an optical fiber 170a that is bent has a larger curvature radius when there is an offset than when there is no offset. As a result, when there is an offset, the load exerted on the end faces of the optical fiber 170a and optical waveguide 140 becomes ¼ of that in the case where there is no offset. That is, the loads exerted on the end faces of the optical fibers 170a and optical waveguides 140 are reduced and the optical fibers 170a and the optical waveguides 140 are able to be prevented from being damaged.

Furthermore, as illustrated in FIG. 5B, when the bundling member 180 does not have an angle of inclination relative to the surface of the substrate 110 and the shape of an optical fiber 170a that is bent is expressed in wavelengths, the shape corresponds to 1.5 wavelengths. In contrast, when the bundling member 180 has an angle of inclination relative to the surface of the substrate 110 and the shape of an optical fiber 170a that is bent is expressed in wavelengths, the shape corresponds to 0.75 wavelength. In other words, a bent optical fiber 170a has a larger curvature radius when there is an angle of inclination than when there is no angle of inclination. As a result, when there is an angle of inclination, the load exerted on the end faces of the optical fiber 170a and optical waveguide 140 becomes ¼ of that in the case where there is no angle of inclination. In addition, when there is an angle of inclination, the bending stress on the optical fiber 170a is also ¼ of that in the case where there is no angle of inclination. That is, the loads and stress exerted on the optical fibers 170a and optical waveguides 140 are reduced, and the optical fibers 170a and the optical waveguides 140 are able to be prevented from being damaged.

As described above, the optical module 100 has the optical fiber bundle 170 that is mounted in the state where the bundling member 180: is provided with an offset in its position; and has an angle of inclination. Therefore, the loads and stress exerted on the optical fibers 170a and optical waveguides 140 at the time of mounting are able to be reduced, and the optical fibers 170a and the optical waveguides 140 are prevented from being damaged.

Figure 6:
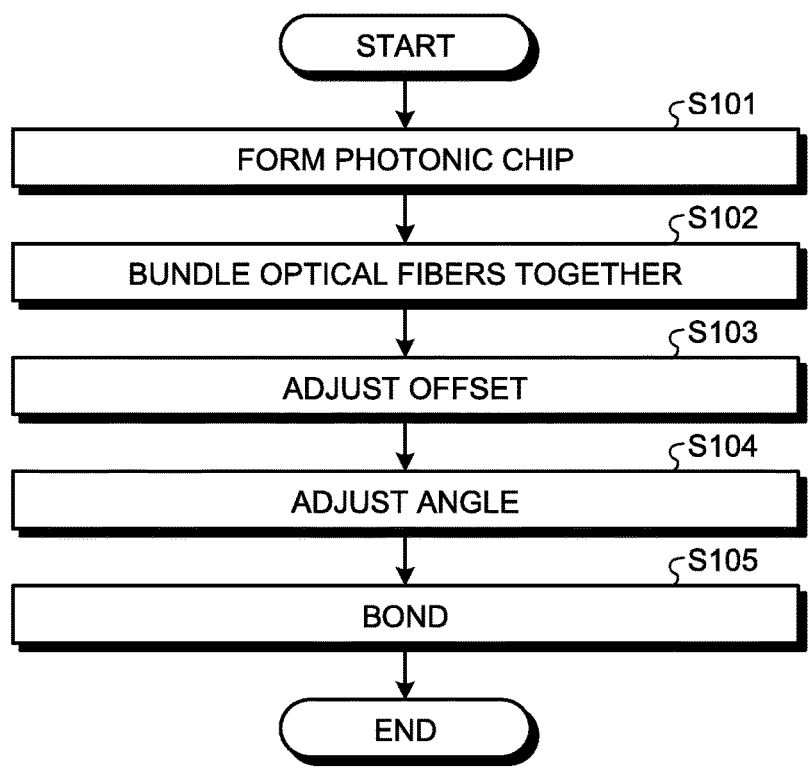
FIG. 6 is a flow chart illustrating an optical fiber mounting method according to the embodiment.

Described specifically next while reference is made to a flow chart illustrated in FIG. 6 is an optical fiber mounting method.

Firstly, a photonic chip is formed by: the LSI 120 and photoelectric conversion units 130 being mounted on the substrate 110; and the optical waveguides 140 being formed on the substrate 110 (Step S101). The connecting portion 150 is provided at the end portion of the substrate 110 and the fiber guiding grooves 150a are formed on the bottom surface of the connecting portion 150. Positions of the fiber guiding grooves 150a correspond to positions of the end faces of the optical waveguides 140 extending from the photoelectric conversion units 130.

The plural optical fibers 170a connected to the optical connector 160 are bundled with the bundling member 180 (Step S102) and the optical fiber bundle 170 is thereby formed. Lengths of the optical fibers 170a from the bundling member 180 to the end portion of the optical fibers 170a are not equal, the end portion being at an end opposite to that at the optical connector 160, and positions of the end portions of the optical fibers 170a are irregular.

The optical fiber bundle 170 is mounted on the photonic chip. Specifically, the end portion of the optical fibers 170a is guided through the fiber guiding grooves 150a of the connecting portion 150 and the end faces of the optical fibers 170a and the end faces of the optical waveguides 140 come into contact with each other with the end faces of the optical fibers 170a facing the end faces of the optical waveguides 140. As this is done, the offset of the bundling member 180 from the surface of the substrate 110 is adjusted (Step S103) and the angle of inclination of the bundling member 180 relative to the surface of the substrate 110 is adjusted (Step S104). By the bundling member 180 moving in a direction of approaching the optical waveguide 140 in a state of having the offset and angle of inclination, the end faces of the optical fibers 170a come into contact with the end faces of the optical waveguides 140.

That is, in order from the longest one of the optical fibers 170a of the bundling member 180, the end faces of the optical fibers 170a come into contact with the end faces of the optical waveguides 140, and when the end face of a shorter one of the optical fibers 170a comes into contact with an end face of the optical waveguides 140, the optical fibers 170a that are already in contact with the optical waveguides 140 are bent. According to this embodiment, by the adjustment of the offset and angle of inclination of the bundling member 180, the loads exerted on the bent optical fibers 170a and optical waveguides 140 are reduced, and the optical fibers 170a and the optical waveguides 140 are thus prevented from being damaged in the process where the optical fibers 170a are bent.

When the end faces of all of the optical fibers 170a forming the optical fiber bundle 170 have come into contact with the end faces of the optical waveguides 140 with the end faces of the optical fibers 170a facing the end faces of the optical waveguides 140, the end portion of the optical fibers 170a is bonded to the connecting portion 150 with an adhesive, for example, ultraviolet curing resin or photocurable resin (Step S105). By the bonding of the end portion of the optical fibers 170a to the connecting portion 150, even if the offset and angle of inclination of the bundling member 180 are no longer there, the loads exerted on the optical fibers 170a and optical waveguides 140 are not changed and the optical fibers 170a and the optical waveguides 140 will not be damaged. Therefore, after the optical fibers 170a have been bonded, the position and posture of the bundling member 180 may be not restricted.

Figure 7:
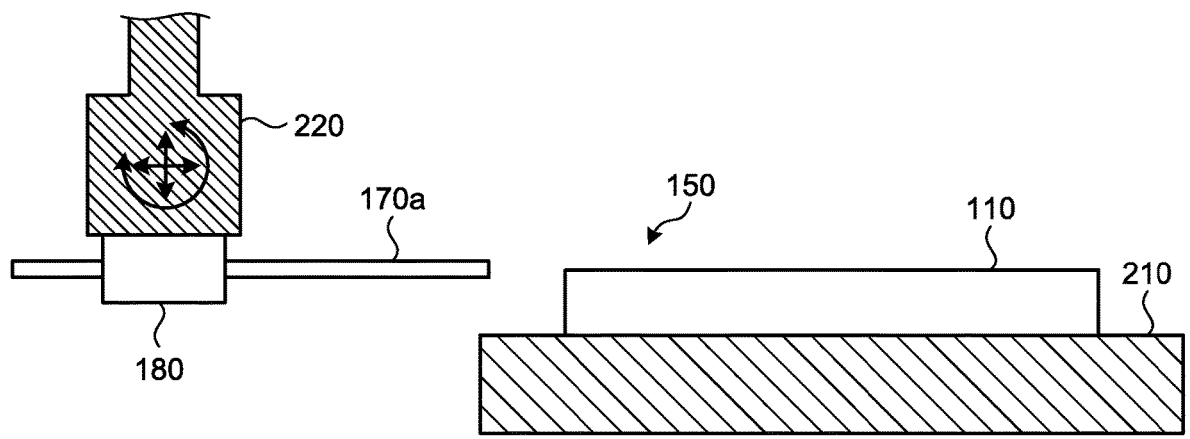
FIG. 7 is a diagram illustrating a specific example of the optical fiber mounting method.

Described next is a specific example of a method of adjusting the offset and angle of inclination of the bundling member 180. A first method of adjusting the offset and angle of inclination of the bundling member 180 is a method in which a mounting device is used. FIG. 7 is a diagram illustrating a method in which the end portion of the optical fibers 170a is mounted on the connecting portion 150 by use of the mounting device.

The mounting device has a stage 210 where the photonic chip is placed and a head 220 configured to hold the bundling member 180. The substrate 110 having the optical waveguides 140 formed thereon and having the connecting portion 150 is placed on the stage 210, and the bundling member 180 with which the optical fibers 170a are bundled together is held by the head 220. The head 220 may hold the bundling member 180 by, for example, sucking the bundling member 180. The head 220 is movable upward, downward, leftward, and rightward on the plane of the page and is rotatable about a rotation axis along a depth direction heading into the plane of the page. The head 220 adjusts the offset and angle of inclination of the bundling member 180 relative to the surface of the substrate 110 on the stage 210 by moving and rotating in the state of sucking and holding the bundling member 180. Furthermore, the head 220 brings the bundling member 180 that has been adjusted in the offset and angle of inclination nearer to the substrate 110 on the stage 210 and guides the end portion of the optical fibers 170a to the connecting portion 150. The optical fibers 170a are thereby able to be connected to the photonic chip with the offset and angle of inclination of the bundling member 180 adjusted.

Figure 8:
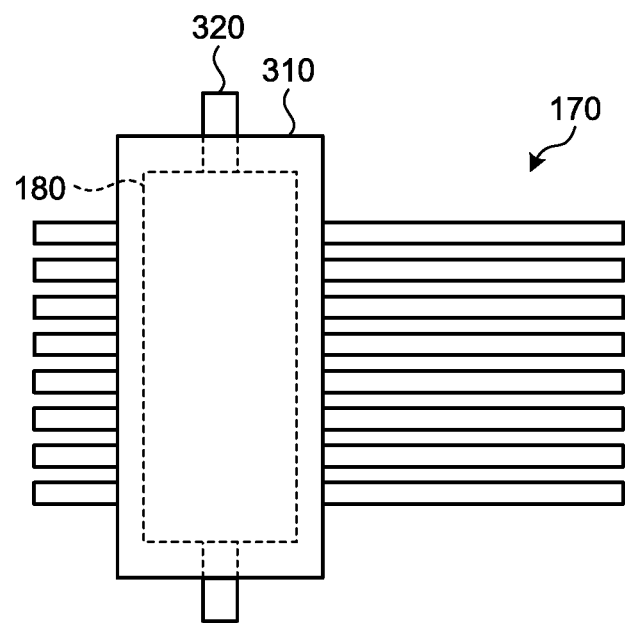
FIG. 8 is a diagram illustrating a configuration of a mounting jig.
Figure 8:
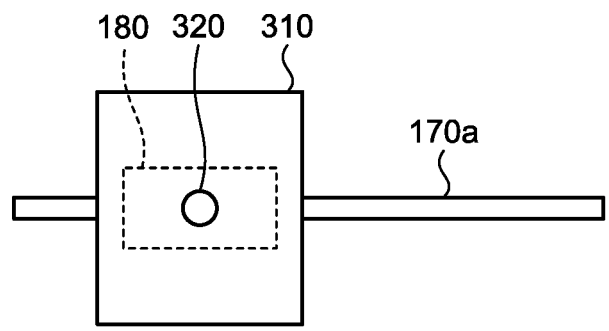
Figure 9:
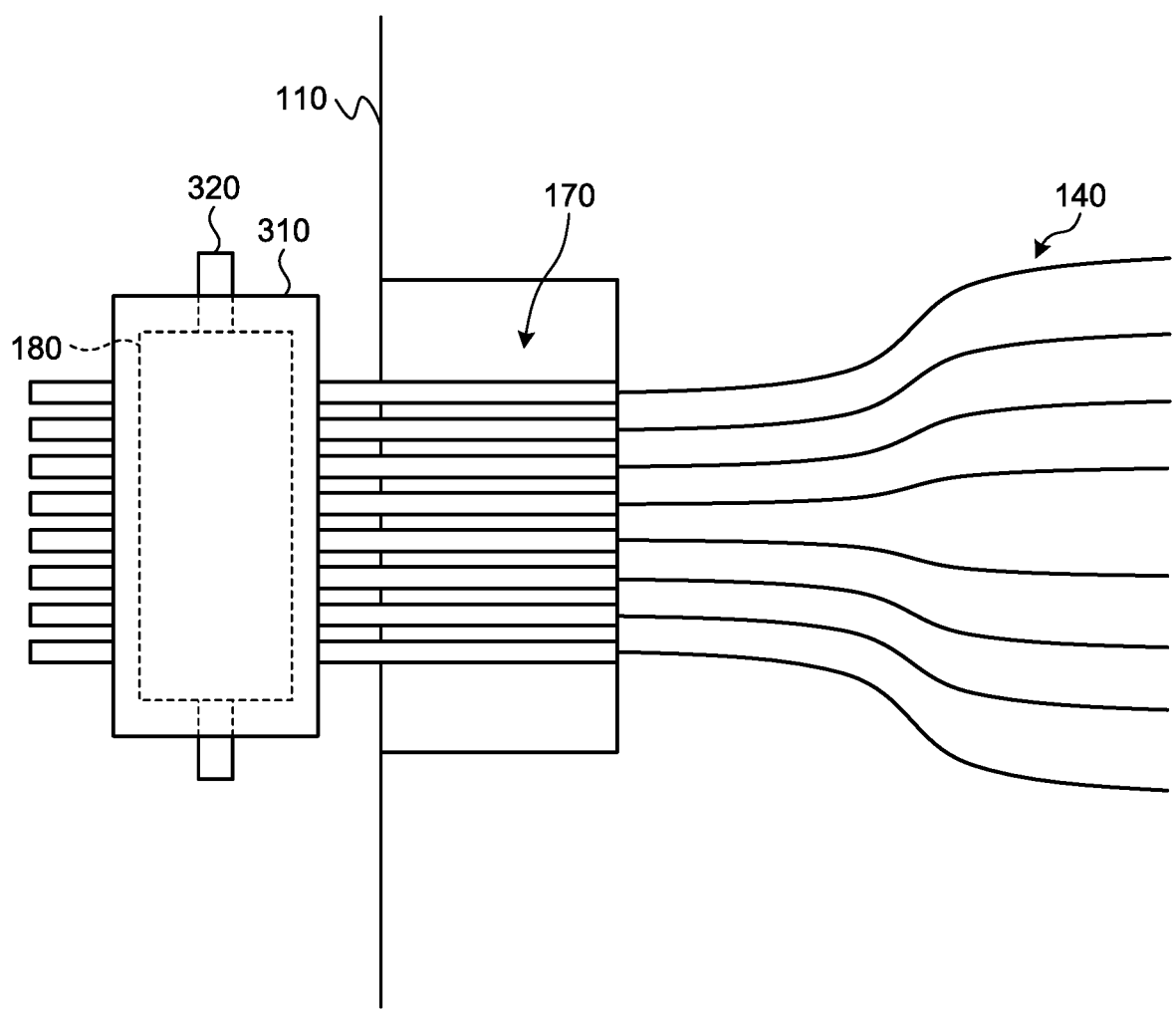
FIG. 9 is a diagram illustrating another specific example of the optical fiber mounting method.

A second method of adjusting the offset and angle of inclination of the bundling member 180 is a method in which a mounting jig is used. FIG. 8 is a diagram illustrating a configuration of the mounting jig, the diagram including an upper figure that is a plan view of the mounting jig and a lower figure that is a side view of the mounting jig. As illustrated in FIG. 8, the mounting jig has a case 310 where the bundling member 180 is stored and pins 320 that are configured to support the bundling member 180 rotatably. In the case 310, the bundling member 180 with which the optical fibers 170a are bundled is stored, and the bundling member 180 is rotatably held between the pair of pins 320 inside the case 310. The angle of inclination of the bundling member 180 is adjusted by rotation of the pins 320 in this state and the optical fibers 170a and the optical waveguides 140 are positioned by adjustment of the position of the mounting jig as illustrated in FIG. 9. The optical fibers 170a are thereby able to be connected to the photonic chip with the offset and angle of inclination of the bundling member 180 adjusted. The mounting jig illustrated in FIG. 8 may be used as the head 220 of the mounting device illustrated in FIG. 7.

As described above, according to the embodiment, plural optical fibers are bundled with a bundling member, and end faces of all of the optical fibers are brought into contact with end faces of optical waveguide on a substrate while the offset and angle of inclination of the bundling member are adjusted. Therefore, after the end faces of the longer optical fibers have come into contact with the end faces of the optical waveguides, until the end faces of the shorter optical fibers come into contact with the end faces of the optical waveguides, even if the longer optical fibers are bent, loads exerted on the optical fibers and optical waveguides are able to be reduced. As a result, the optical fibers and the optical waveguides are able to be prevented from being damaged.

Achieved according to an aspect of an optical fiber mounting method and an optical module disclosed by this patent application is an effect that optical fibers and optical waveguides are able to be prevented from being damaged.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An optical fiber mounting method of mounting a plurality of optical fibers on a substrate, the optical fiber mounting method comprising:
    bundling the optical fibers together with a bundling member;
    adjusting a height of the bundling member from a surface of the substrate or an angle of inclination of the bundling member relative to the surface of the substrate;
    bringing end faces of the optical fibers bundled with the bundling member into contact with end faces of optical waveguides on the substrate, the optical waveguides respectively corresponding to the optical fibers; and
    bonding the optical fibers to the substrate, in a state where the end faces of the optical fibers are in contact with the end faces of the optical waveguides.

2. The optical fiber mounting method according to claim 1, wherein
    the adjusting includes adjusting the height of the bundling member from the surface of the substrate or the angle of inclination of the bundling member relative to the surface of the substrate, such that a curvature radius of an optical fiber that is bent by contact between an end face of the optical fiber and an end face of the optical waveguides becomes large.

3. The optical fiber mounting method according to claim 1, wherein
    the adjusting includes adjusting the height of the bundling member from the surface of the substrate or the angle of inclination of the bundling member relative to the surface of the substrate, by using a mounting device having a head that holds the bundling member and a stage that has the substrate placed thereon to move or rotate the head.

4. The optical fiber mounting method according to claim 1, wherein
    the adjusting includes adjusting the height of the bundling member from the surface of the substrate or the angle of inclination of the bundling member relative to the surface of the substrate, by using a mounting jig having a case that stores the bundling member and a pair of pins that hold therebetween rotatably the bundling member stored in the case.

5. An optical module, comprising:
    a substrate having optical waveguides formed thereon;
    a plurality of optical fibers; and
    a bundling member with which the optical fibers are bundled together, wherein
    when the optical fibers are connected to the substrate, the optical fibers are bonded to the substrate while maintaining contact between end faces of the optical fibers and end faces of the optical waveguides respectively corresponding to the optical fibers, in a state where a height of the bundling member from a surface of the substrate or an angle of inclination of the bundling member relative to the surface of the substrate is adjusted.

* * * * *